United States Patent
Zhang

(10) Patent No.: US 8,009,699 B2
(45) Date of Patent: Aug. 30, 2011

(54) EFFICIENT ENCODING OF OUT OF ORDER DATA PACKETS IN A NETWORK

(75) Inventor: Xinping Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1054 days.

(21) Appl. No.: 11/180,001

(22) Filed: Jul. 12, 2005

(65) Prior Publication Data

US 2007/0025387 A1 Feb. 1, 2007

(51) Int. Cl.
*H04J 3/00* (2006.01)
*H04J 3/18* (2006.01)

(52) U.S. Cl. .................................. 370/476; 370/477

(58) Field of Classification Search .................. None
See application file for complete search history.

(56) References Cited

U.S. PATENT DOCUMENTS

| | | | |
|---|---|---|---|
| 6,680,955 B1 * | 1/2004 | Le | 370/477 |
| 6,782,047 B1 * | 8/2004 | Le et al. | 375/240 |
| 6,882,637 B1 | 4/2005 | Le et al. | |
| 7,583,695 B2 * | 9/2009 | Vimpari et al. | 370/466 |
| 7,583,701 B2 * | 9/2009 | Miyazaki et al. | 370/477 |
| 2004/0264433 A1 * | 12/2004 | Melpignano | 370/349 |
| 2006/0120352 A1 * | 6/2006 | Agashe et al. | 370/352 |

FOREIGN PATENT DOCUMENTS

| | | | |
|---|---|---|---|
| JP | 2003008644 A | 1/2003 | |
| JP | 2003304299 A | 10/2003 | |

OTHER PUBLICATIONS

Bormann et al., Robust Header Compression, Jul. 2001, Network Working Group, RFC 3095, pp. 25-28.*
International Search Report—PCT/US06/026663—ISA/EPO—Dec. 4, 2006.
Written Opinion—PCT/US06/02663—ISA/EPO—Dec. 4, 2006.
Bormann et al., "Robust Header Compression (ROHC)", IETF Standard-Working-Draft, Internet Engineering Task Force, IETF, CH, vol. ROCH, No. 2, Sep. 18, 2000.
International Preliminary Report on Patentability—PCT/US06/026663—The International Bureau of WIPO—Geneva, Switzerland—Jan. 16, 2008.
Kapoor, Rohit. Qualcomm, Robust Header Compression (ROHC) Support for Reprdering and Constant IP-ID, Internet Draft draft-kapoor-rohc-rtp-new-requirements-00, Mar. 15, 2004. pp. 3-6. URL: http://www.tools.ietf.org/pdf/ draft-kapoor-rohc-rtp-new-requirements-00.pdf.

* cited by examiner

*Primary Examiner* — Ayaz R Sheikh
*Assistant Examiner* — Timothy J Weidner
(74) *Attorney, Agent, or Firm* — Timothy F. Loomis; Kristine U. Ekwueme

(57) ABSTRACT

An apparatus and system for encoding out of order data packets in a network are described. At a source unit, an out-of-order parameter is selected as the maximum out of order range value of data packets to be encoded with a minimum header size. A shifting parameter is then calculated using the selected out-of-order parameter. For a new data packet received, having a predetermined header field value, an interpretation interval is further calculated as a function of the shifting parameter and a reference value of a header field within a previously transmitted data packet. An encoding and compression algorithm is then applied to the predetermined header field value using the calculated interpretation interval, and the compressed value is further transmitted to a destination unit.

61 Claims, 7 Drawing Sheets

EFFICIENT ENCODING OF OUT OF ORDER DATA PACKETS IN A NETWORK

BACKGROUND

1. Field of the Invention

The present invention relates generally to data communications and more specifically to an apparatus and a system for efficient encoding of out of order data packets in a network, such as, for example, a wireless communication network.

2. Background

In recent years, two communication technologies have seen a significant increase in demand. The Internet, with its subset, the World Wide Web (WWW), has seen tremendous increase in usage, even resulting in network capacity issues and, thus, reduced performance of traditional applications. Wireless telephony, also known as cellular telephony, has provided its users with reasonable quality of service and convenient features.

As traditional wireless communication systems are designed for voice communications, new Internet applications, such as, for example, real-time interactive audio/video communications, introduce new challenges and demand improved quality of service parameters. One of these challenges involves conservation of bandwidth and, specifically, the large header overhead associated with transmission of data units of transmission and reception, also known as data packets.

Data packets arrive at a source unit, such as, for example a base station or a Packet Data Serving Node (PDSN), and travel between the source unit and a destination unit, such as, for example, a mobile station, through communication links, such as, for example, wireless (cellular) links. Prior to transmission to the destination unit, the header information stored within each data packet is further compressed at the source unit using one of many known compression algorithms, such as, for example, an algorithm described in detail in "Robust Header Compression (ROHC): Framework and four profiles: RTP, UDP, ESP, and uncompressed," by C. Borman et al., July 2001. Network Working Group, codified as RFC 3095. At the destination, the header information is decompressed and is attached to its corresponding payload to re-form the original data packet.

During transmission and/or reception within the wireless communication system, and prior to arrival at the source unit, certain data packets are lost and/or misplaced. The misplaced data packets eventually reenter the data stream, but their header field information is inconsistent with the rest of the data packets in the stream. As a result, during compression and subsequent decompression of the header information, additional bandwidth is required to identify and transmit such out of order data packets to the destination unit. Alternatively, if the data packets are misplaced between the source unit and the destination unit, the packets may be dropped due to inconsistency and decoding calculation failure.

Since the proposed header compression algorithms do not appear to handle out of order data packets efficiently and do not accomplish an adequate reduction of bandwidth consumption for such packets, there is a need for a robust header compression algorithm able to handle such misordered data packets in a network.

SUMMARY

An apparatus and system for encoding out of order data packets in a network are described. At a source unit, an out-of-order parameter is selected as the maximum out of order range value of data packets to be encoded with a minimum header size. A shifting parameter is then calculated using the selected out-of-order parameter. For a new data packet received, having a predetermined header field value, an interpretation interval is further calculated as a function of the shifting parameter and a reference value of a header field within a previously transmitted data packet. An encoding and compression algorithm is then applied to the predetermined header field value using the calculated interpretation interval, and the compressed value is further transmitted to a destination unit.

DETAILED DESCRIPTION

Figure 1A:
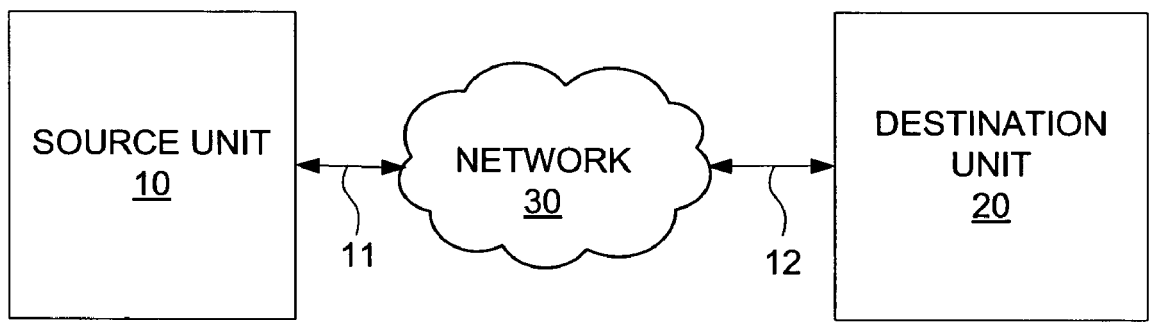
FIG. 1A illustrates an exemplary data transmission network.

FIG. 1A illustrates an exemplary data transmission network 30, in which a system for encoding out of order data packets may be used, and which may, in one embodiment, be a packet network, such as, for example, an Asynchronous Transfer Mode (ATM) network, a Frame Relay network, or a Voice over Internet Protocol (VoIP) network. In alternate embodiments, the network 30 may be a Public Switched Telephone Network (PSTN), the Plain Old Telephone Service (POTS) network, a wireless (cellular) network, a satellite network, an Integrated Services Digital Network (ISDN), or any other type of public or private network.

Within the network 30, one or more source units 10 communicate with one or more destination units 20 via communication links 11, 12. Depending on the type of network 30, the communication links 11, 12 may be wired links, such as, for example, wired telephone links, or wireless links, such as, for example, cellular telephone links. If the communication links 11, 12 are wireless links, the source unit 10 and the destination unit 20 may correspond, respectively, to a base station or a Packet Data Service Node (PDSN), and a mobile station, as described in further detail below.

Figure 1B:
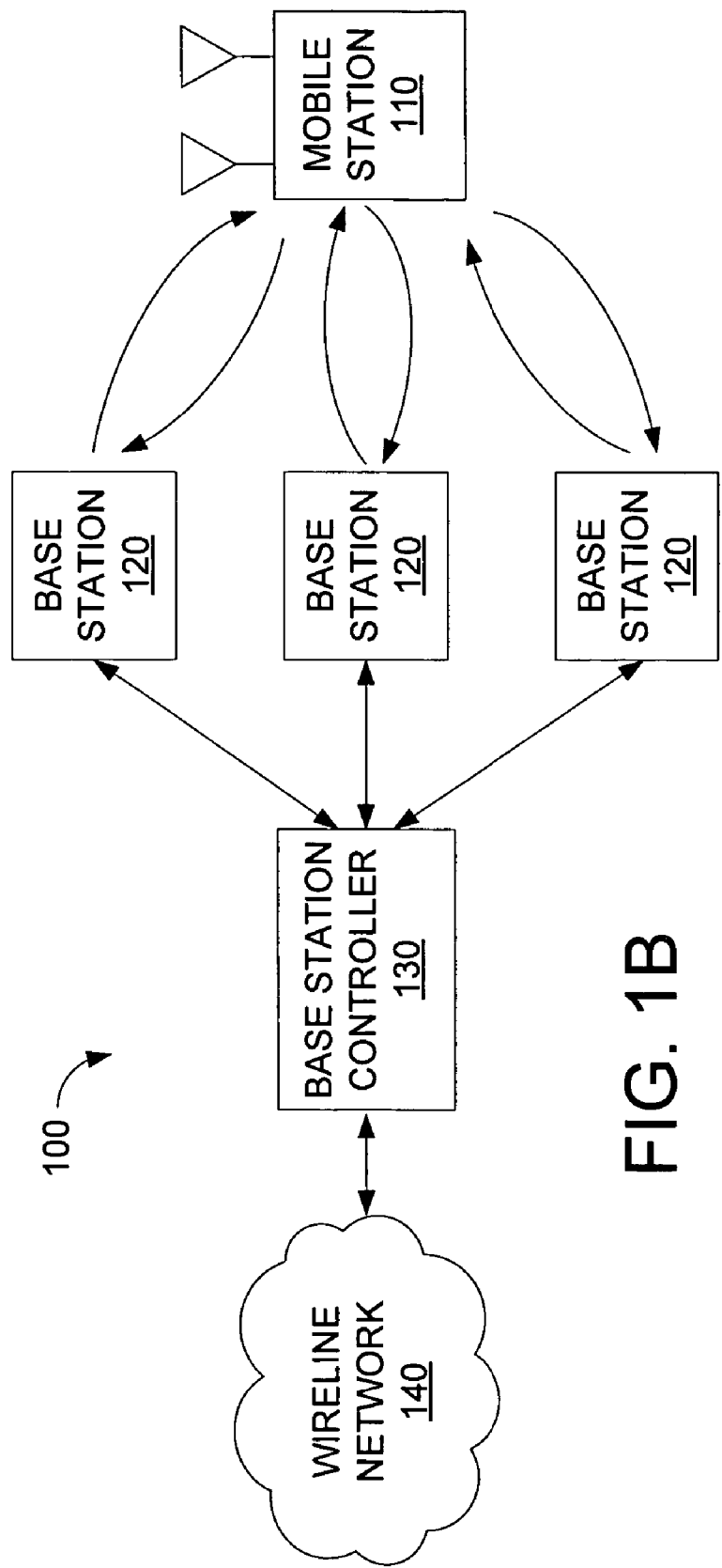
FIG. 1B illustrates an exemplary wireless communications network.

FIG. 1B illustrates an exemplary wireless communications network 100 in which a system for encoding out of order data packets may be used. A mobile station 110, which may be mobile or stationary, may communicate with one or more base stations 120. A mobile station 110, also referred herein as a "mobile", transmits and receives voice or data or both through one or more base stations 120 connected to a base station controller 130. Base stations 120 and base station controllers 130 are parts of a network called an Access Network. Base station controller 130 connects to a wireline network 140. An access network transports voice or data to and between base stations 120. The access network may be further connected to additional networks outside the access network, such as a wired telephone system, a corporate intranet, or the Internet, all of which may constitute part of the wireline network 140. The access network may transport voice and data between each access mobile 110 and such outside networks.

A mobile 110 that has established an active traffic channel connection with one or more base stations 120 is called an active mobile station, and is said to be in a traffic state. A mobile 110 that is in the process of establishing an active traffic channel connection with one or more base stations 120 is said to be in a connection setup state. The communication link that the mobile 110 uses to sends signals to the base station 120 is called the reverse link 160. The communication link through that a base station 120 uses to send signals to a mobile 110 is called the forward link 150.

The systems and apparatuses described herein for encoding moderately out of order data packets are applicable to any wireless communication system, using various multiple access schemes, such as, but not limited to, Code Division Multiple Access (CDMA), Frequency Division Multiple Access (FDMA), Orthogonal Frequency Division Multiplexing (OFDM) or Time Division Multiple Access (TDMA). Examples of CDMA multiple access schemes include but are not limited to TIA/EIA/IS-95, TIA/EIA/IS-2000 or cdma2000, 1xEV-DO, 1xEV-DV, 802.11a, 802.11b, 802.11g, 802.11n, WIMAX, and WCDMA.

Figure 2:
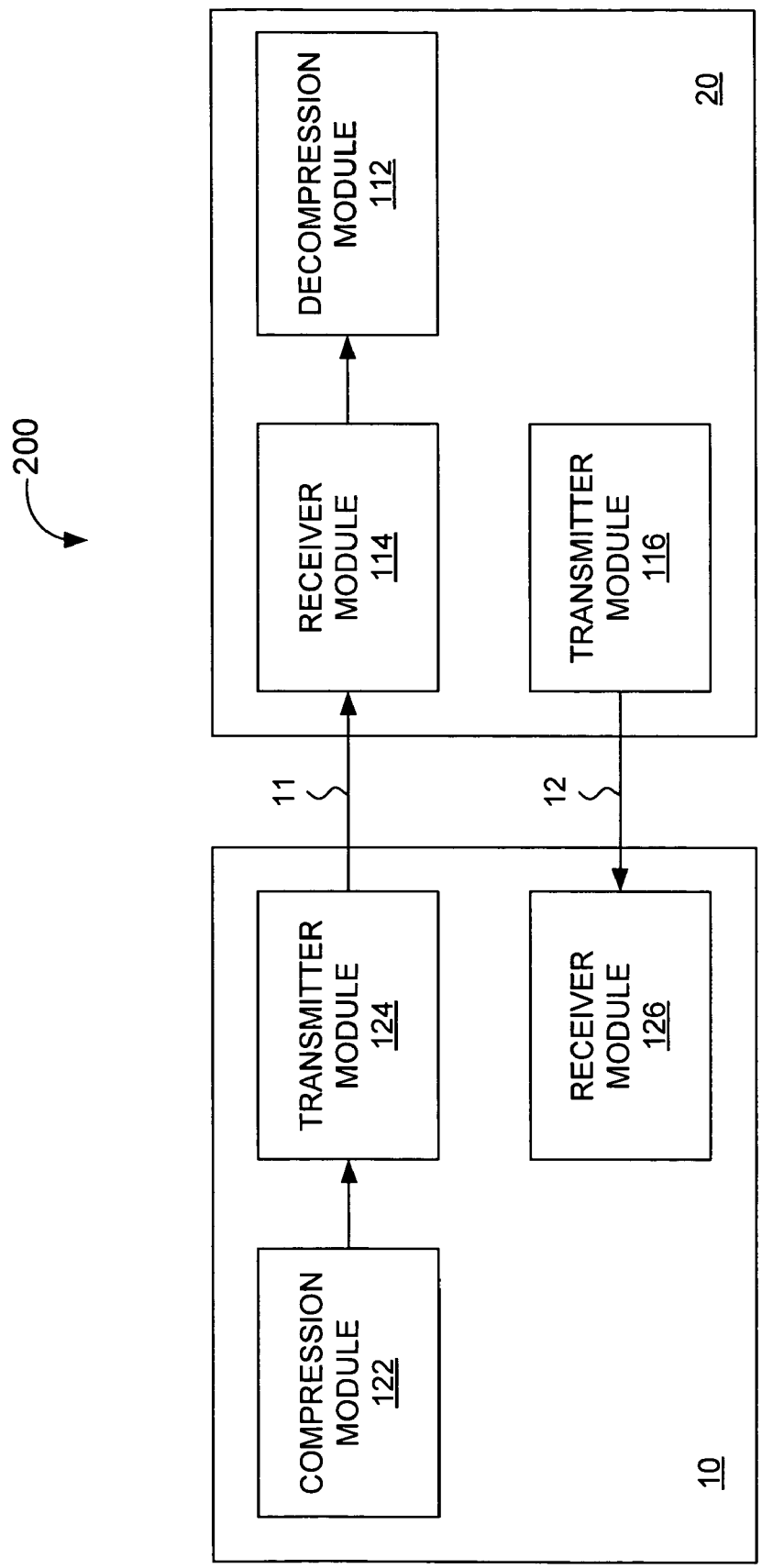
FIG. 2 illustrates a system for encoding out of order data packets within the data transmission network, according to one embodiment of the invention.

FIG. 2 illustrates a system 200 for encoding out of order data packets within the network 30. In one embodiment illustrated in FIG. 2, the system 200 further comprises the source unit 10 and the destination unit 20. The source unit 10 further comprises a compression module 122 coupled to a transmitter module 124 for transmitting information, such as, for example, data packets, to the destination unit 20 and a receiver module 126 for receiving information, such as, for example, data packets, from the destination unit 20. Similarly, the destination unit 20 further comprises a receiver module 112 for receiving data packets from the source unit 10, a decompression module 114 coupled to the receiver module 112, and a transmitter module 116 for transmitting data packets to the source unit 10.

In one embodiment, the compression module 122, the transmitter module 124, and the receiver module 126 are hardware and/or software modules within the source unit 10. Alternatively, the compression module 122, the transmitter module 124, and the receiver module 126 may be part of a network interface module (not shown) communicating with the destination unit 20. Similarly, in one embodiment, the receiver module 112, the decompression module 114, and the transmitter module 116 are hardware and/or software modules within the destination unit 20. Alternatively, the receiver module 112, the decompression module 114, and the transmitter module 116 may be part of a network interface module (not shown) communicating with the source unit 10.

Figure 4:
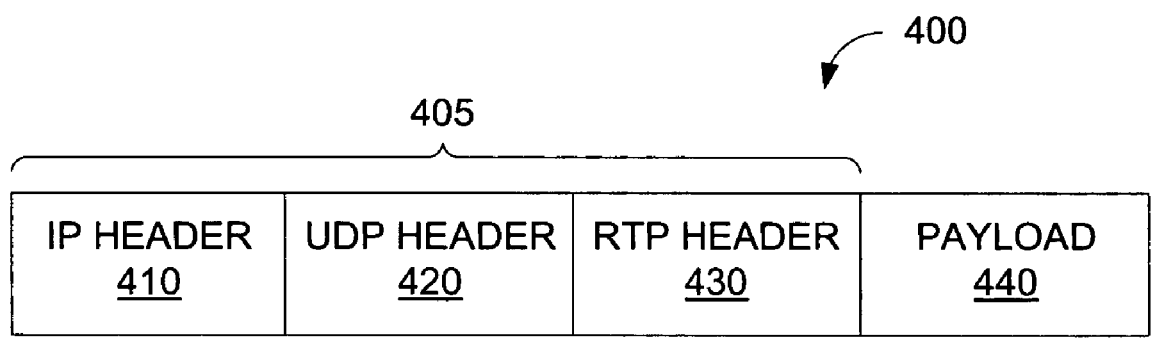
FIG. 4 illustrates a data packet transmitted within the data transmission network, according to one embodiment of the invention.

In one example illustrated in FIG. 4, a data packet 400 received at the source unit 10 includes a data payload 440, containing data to be transmitted within the network 30, and a header 405 attached to the payload 440 and containing multiple fields of header data used in administration of the data packets within the network 30. In one embodiment, the data packets 400 are transmitted within the network using a Real-Time Transfer Protocol (RTP), which is a protocol that supports real time transmission of voice and video packets, on top of a User Datagram Protocol (UDP)/Internet Protocol (IP).

In the RTP/UDP/IP environment described above, the header 405 further includes an RTP header 430, containing at least 12 bytes of data, an UDP header 420, containing at least 8 bytes of data, and an IP header 410, containing at least 20 bytes of data. Since the header 405 contains at least 40 bytes of data, and a sizable portion of such header data is static, the header 405 is typically compressed in the compression module 122 of the source unit 10 before being transmitted to the destination unit 20. Static header fields are transmitted at the beginning of a session, which encompasses a series of data packets 400. The remaining dynamic header fields, such as, for example, an RTP timestamp (TS) field, an RTP sequence number (SN) field, and an IP identification (IP-ID) field, must be compressed before transmission. However, since all dynamic header fields may ultimately be inferred from the value of the RTP SN field, in most cases the RTP SN is the only field that needs to be compressed and transmitted with each data packet 400.

One known compression and encoding mechanism has been described in detail in "Robust Header Compression (ROHC): Framework and four profiles: RTP, UDP, ESP, and uncompressed," by C. Borman et al., July 2001. Network Working Group, codified as RFC 3095. The ROHC standard defines four profiles, an uncompressed profile, the main RTP compression profile, and two alternate profiles where RTP compression is not applicable.

Referring back to FIG. 2, initially, the compression module 122 is in an Initialization and Refresh (IR) state and transmits complete header information, including all static and dynamic header fields in uncompressed format. The compression module 122 remains in this state until it is fairly confident that the decompression module 112 within the destination unit 20 has received the static header field information correctly and is able to create an appropriate context for the flow of data packets 400. In the next state, known as the First Order (FO) state, the compression module 122 communicates irregularities in the data packet stream that may affect the context information, such as, for example, updates of the dynamic header fields. The compression module 122 enters the final state, known as the Second Order (SO) state, when the header 405 to be compressed is predictable given the RTP SN field information and its relationship with other dynamic header fields. Thus, an accurate decompression of data packets 400 sent in the SO state depends only on accurate decompression of the RTP SN information.

Considering an SN field value "v" to be encoded and compressed in the compression module 122, an algorithm is defined, which facilitates transmission of the "k" least significant bits of the "v" value, if a previously transmitted reference value "v_ref" is present at both the compression module 122 and the decompression module 112. The algorithm can be applied if the compression module 122 and the decompression module 112 each use an interpretation interval or shifting interval in which "v" resides and in which "v" is the only value that has the exact same "k" as those transmitted.

In one embodiment, the interpretation interval in which "v" is expected to vary is defined by a function f(v_ref, k), as follows:

$$f(v\_ref, k) = [v\_ref - p, v\_ref + (2^k - 1) - p]$$

where a shifting parameter "p" is an integer and is selected specifically for the SN header field, as follows:

$$p = 1 \text{ for } k \leq 4; \text{ and } p = 2^{k-5} - 1 \text{ for } k > 4$$

The compression module 122 selects "k" as the minimum value such that "v" falls within the interpretation interval defined by f(v_ref, k). This "k" function may be represented as follows:

$$k = g(v\_ref, v)$$

Due to potential data packet loss in the communication between the source unit 10 and the destination unit 20, the compression module 122 and the decompression module 112 may lose the synchronization of v_ref and of the interpretation interval. Therefore, a sliding window is introduced, which contains the last values that have already been transmitted, and which includes a minimum value "v_min" and a maximum value "v_max." When the compression module 122 transmits a new value "v_new" to the decompression module 112 via the transmitter module 124 and the link 11, it simultaneously adds the new value to the sliding window.

In the sliding window encoding scheme, for each value "v" being compressed, the compression module 122 selects "k" according to the formula:

$$k = \max(g(v\_min, v), g(v\_max, v))$$

where g is the function defined above.

As a result, the number of bits "k" needed to uniquely identify the desired sequence number value "v" increases with the number of values in the window or for data packets 400 that arrive slightly out of order and have varying sequence numbers. Subsequent to the selection of "k," the compression module 122 selects a packet type for transmission to the destination unit 20, which contains at least "k" bits required for the sequence number, such as, for example, a "type 0" packet having a predetermined number of bits reserved for the RTP SN header field. When the number of bits "k" needed to encode the RTP SN header field increases, a "type 1" or "type 2" larger packet has to be used, thus increasing bandwidth consumption.

In one example of the above algorithm, assuming that the compression module 122 has already transmitted the SN header field values 249, 250, 251, 252, 253, as shown in Table 1, then the sliding window is [249, 250, 251, 252, 253] and includes v_min=249 and v_max=253. The reference value v_ref at both the compression module 122 and the decompression module 112 is the last value transmitted v_ref=253.

TABLE 1

| RTP SN | Representation |
| --- | --- |
| 249 | 000011111001 |
| 250 | 000011111010 |
| 251 | 000011111011 |
| 252 | 000011111100 |
| 253 | 000011111101 |

If the compression module 122 receives a new data packet 400 with a sequence number field value v=254, represented as "000011111110," then the number of least significant bits "k" is k=max (g(249, 254), g(253, 254) )=max (3, 1)=3. Thus, the last three bits of the value 254, represented as "110," are transmitted to the decompression module 112 within the destination unit 20 through the transmitter module 124 and the link 11. The v_ref value at the decompression module is still 253 and the interpretation interval is f(253, 3)=[253−1, 253+7−1]=[252, 259], as shown in Table 2, where p=1 for k≦4.

TABLE 2

| RTP SN | Representation |
| --- | --- |
| 252 | 000011111100 |
| 253 | 000011111101 |
| 254 | 000011111110 |
| 255 | 000011111111 |
| 256 | 000100000000 |
| 257 | 000100000001 |
| 258 | 000100000010 |
| 259 | 000100000011 |

The decompression module 112 receives the transmitted bits "110" and matches the "110" sequence with the last three bits of a single corresponding value in the interval, specifically with the only value in the interpretation interval [252, 259] that contains the transmitted least significant three bits "110," namely the RTP SN field value 254 intended to be transmitted by the compression module 122.

Let's assume that the compression module 122 further receives a new data packet 400 with an out of order sequence number field value v=248, represented as "000011111000." The new reference value v_ref at the compression module 122 and the decompression module 112 is the last value transmitted, namely 254. Then, the interpretation interval becomes f(254, 3)=[254−1, 254+7−1]=[253, 260], as shown in table 3, where p=1 for k<4.

TABLE 3

| RTP SN | Representation |
| --- | --- |
| 253 | 000011111101 |
| 254 | 000011111110 |
| 255 | 000011111111 |
| 256 | 000100000000 |
| 257 | 000100000001 |
| 258 | 000100000010 |
| 259 | 000100000011 |
| 260 | 000100000100 |

Clearly, the SN field value v=248 is now outside of the above interpretation interval [253, 260]. If the compression module 122 transmits only the last three bits of the value 248, specifically "000," then the decompression module 112 may misinterpret the results and select the sequence number value 256 instead. Therefore, the compression module 122 must increase the number of bits "k" needed to uniquely identify the desired sequence number value v=248, thus increasing bandwidth consumption.

In one embodiment of the invention, in order to recalculate the interpretation interval for out of order data packets 400, the parameter "p" is defined specifically for the RTP SN header field as follows:

$$p = K \text{ for } k \leq 4; \text{ and } p = 2^{k-5} + K \text{ for } k > 4;$$

where the compression module 122 selects the out-of-order parameter "K" from 1≦K<8 as the maximum out of order range value of data packets 400 that need to be encoded and compressed with a minimum header size. As a result, the interpretation interval is shifted to accommodate the out of order data packets 400 and the compression module 122 compresses the data packets 400 with the minimum "type 0" packet. It is assumed that the compression module 122 and the decompression module 112 are able to exchange information using one of many known communication protocols and that both the compression module 122 and the decompression module 112 use the same "p" value for calculation of the interpretation interval.

In the above described example, assuming that the maximum out of order range value of data packets 400 to be encoded and compressed with a minimum header size is K=6, and assuming that the compression module 122 receives a new data packet 400 with the out of order sequence number field value v=248, for the common v_ref value v_ref=254, the interpretation interval at the decompression module 112 is f(254, 3)=[254−6, 254+7−6]=[248, 255], as shown in Table 4, where p=K=6.

TABLE 4

| RTP SN | Representation |
|---|---|
| 248 | 000011111000 |
| 249 | 000011111001 |
| 250 | 000011111010 |
| 251 | 000011111011 |
| 252 | 000011111100 |
| 253 | 000011111101 |
| 254 | 000011111110 |
| 255 | 000011111111 |

As a result, v=248 still resides within the interpretation interval [248, 255]. The minimum number of bits "k" is k=max (g(249, 248), g(254, 248) )=max (1, 3)=3, and the value 248 is the only value that has the unique number of least significant bits "k" identical to those transmitted, in this case "000".

Figure 3:
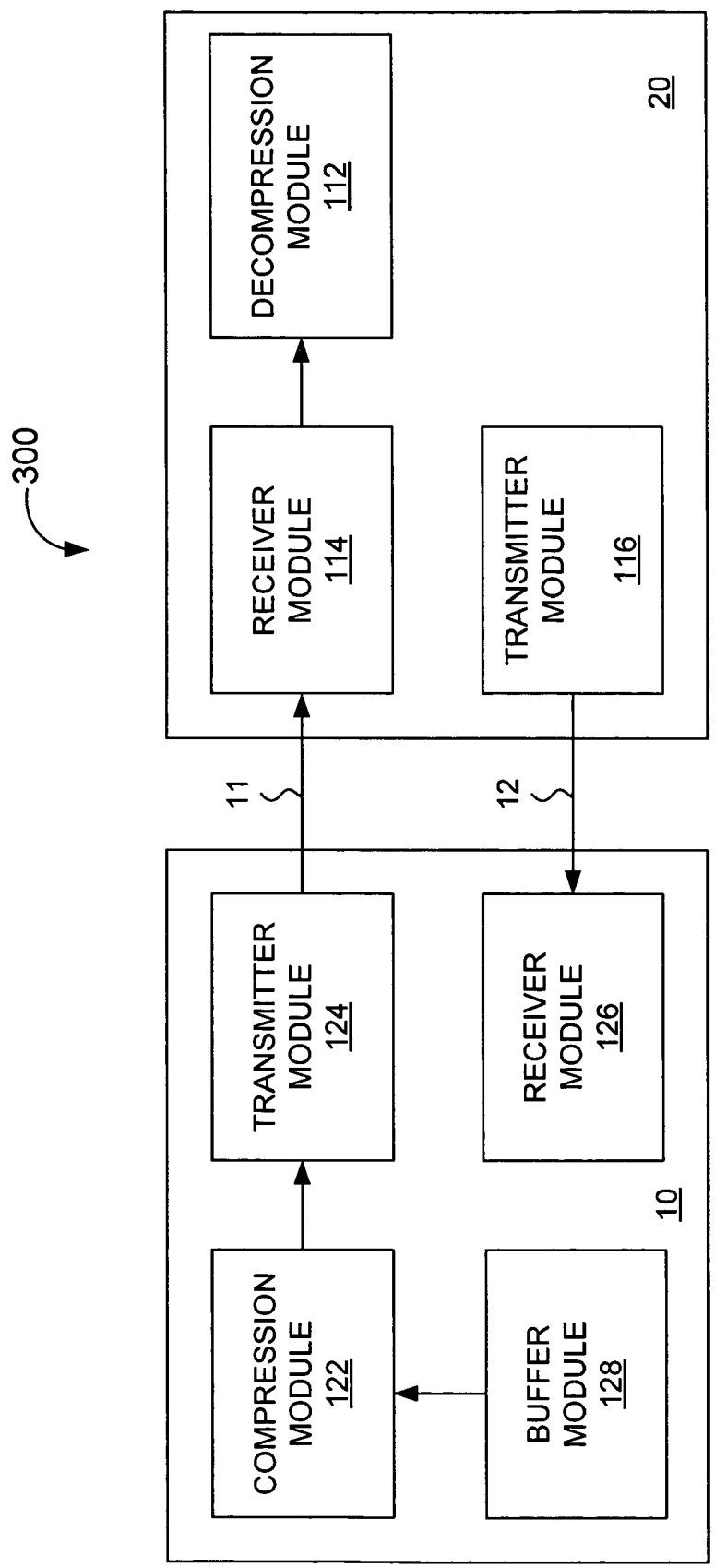
FIG. 3 illustrates a system for encoding out of order data packets within the data transmission network, according to an alternate embodiment of the invention.

FIG. 3 illustrates a system for encoding out of order data packets within the network 30, according to an alternate embodiment of the invention. In the alternate embodiment shown in FIG. 3, the source unit 10 further comprises a buffer module 128, coupled to the compression module 122, for receiving and storing the data packets 400 prior to further encoding and compression at the compression module 122. The buffer module 128 is a hardware and/or software module configured to receive the data packets 400, up to its predetermined capacity, and to reorder the packets according to RTP SN header field value of each data packet 400 prior to transmission to the compression module 122.

In one embodiment, the buffer module 128 has a predetermined capacity "K", where "K" is defined above as the maximum out of order range value of data packets 400 to be compressed or encoded with a minimum header size. Subsequent to reordering and storing the received data packets, the buffer module 128 supplies the ordered data packets 400 to the compression module 122 for encoding and compression according to one of the many known compression algorithms, such as, for example, the W-LSB encoding scheme described in detail in "Robust Header Compression (ROHC): Framework and four profiles: RTP, UDP, ESP, and uncompressed," by C. Borman et al., July 2001. Network Working Group, codified as RFC 3095.

Thus, the synchronization of the reference value v_ref at both the compression module 122 and the decompression module 112 is maintained and the compression module 122 encodes the RTP SN header field values with a minimum number of significant bits "k" capable to be transmitted with a "type 0" packet.

Figure 5:
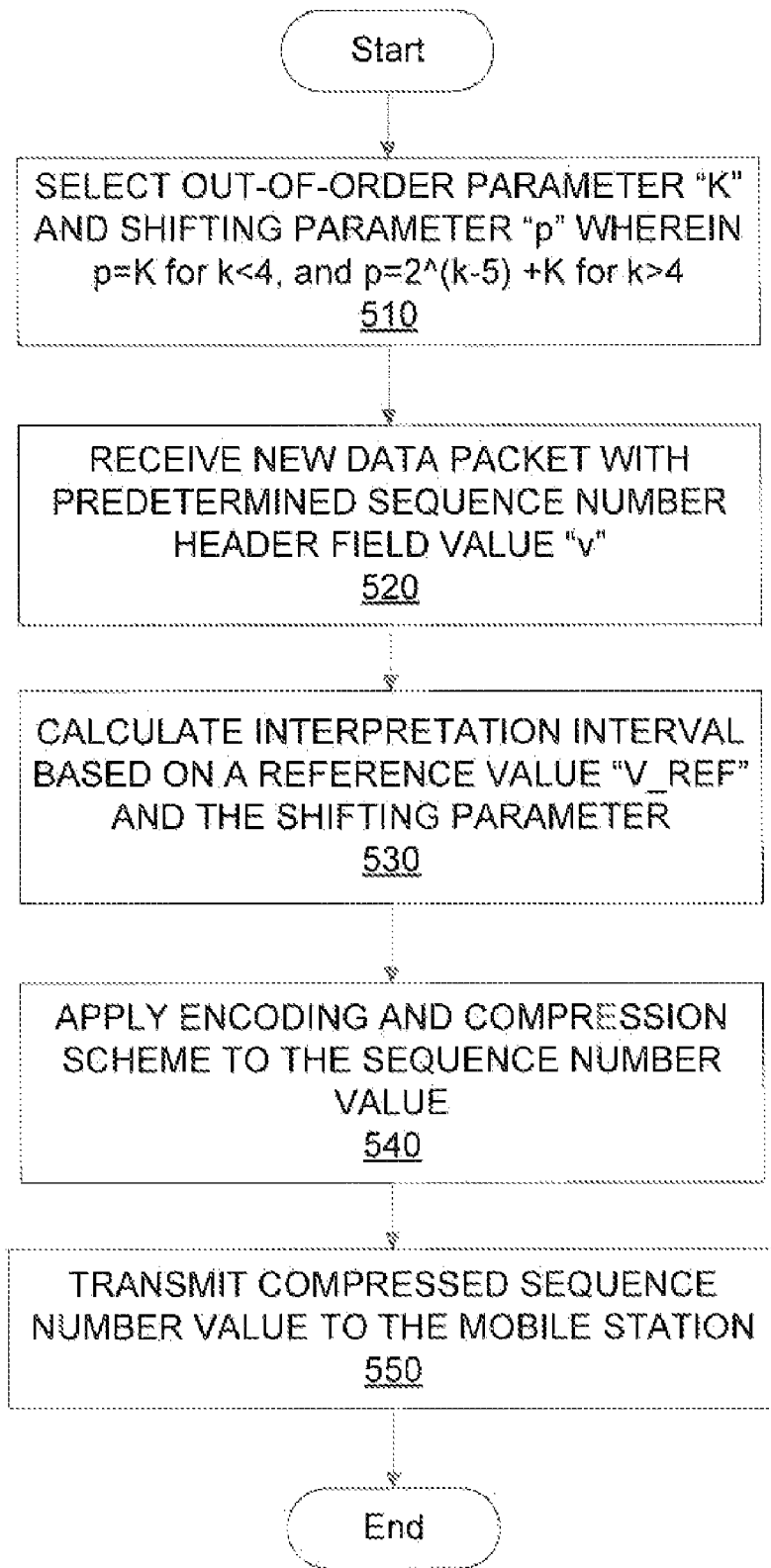
FIG. 5 illustrates a method for encoding out of order data packets within the data transmission network, according to one embodiment of the invention.

FIG. 5 illustrates a method for encoding out of order data packets within the network 30, according to one embodiment of the invention. As illustrated in FIG. 5, at processing block 510, an out-of-order parameter "K" and a shifting parameter "p" are selected, wherein "K" is the maximum out of order range value of data packets 400 to be compressed with a minimum header size, and "p" is selected as p=K for k<4, and p=$2^{k-5}$+K for k>4.

At processing block 520, a data packet 400 is received, the data packet 400 having a predetermined sequence number header field value "v". At processing block 530, an interpretation interval is calculated according to a function f(v_ref, k)=[v_ref−p, v_ref+($2^k$−1)−p], for a previously transmitted reference value "v_ref." At processing block 540, an encoding and compression scheme is applied to the value "v." Finally, at processing block 550, the compressed value "v" is transmitted to the destination unit 20 in a minimum size packet type. The processing blocks 520 through 550 are then repeated for subsequent data packets 400 received at the source unit 10.

Figure 6:
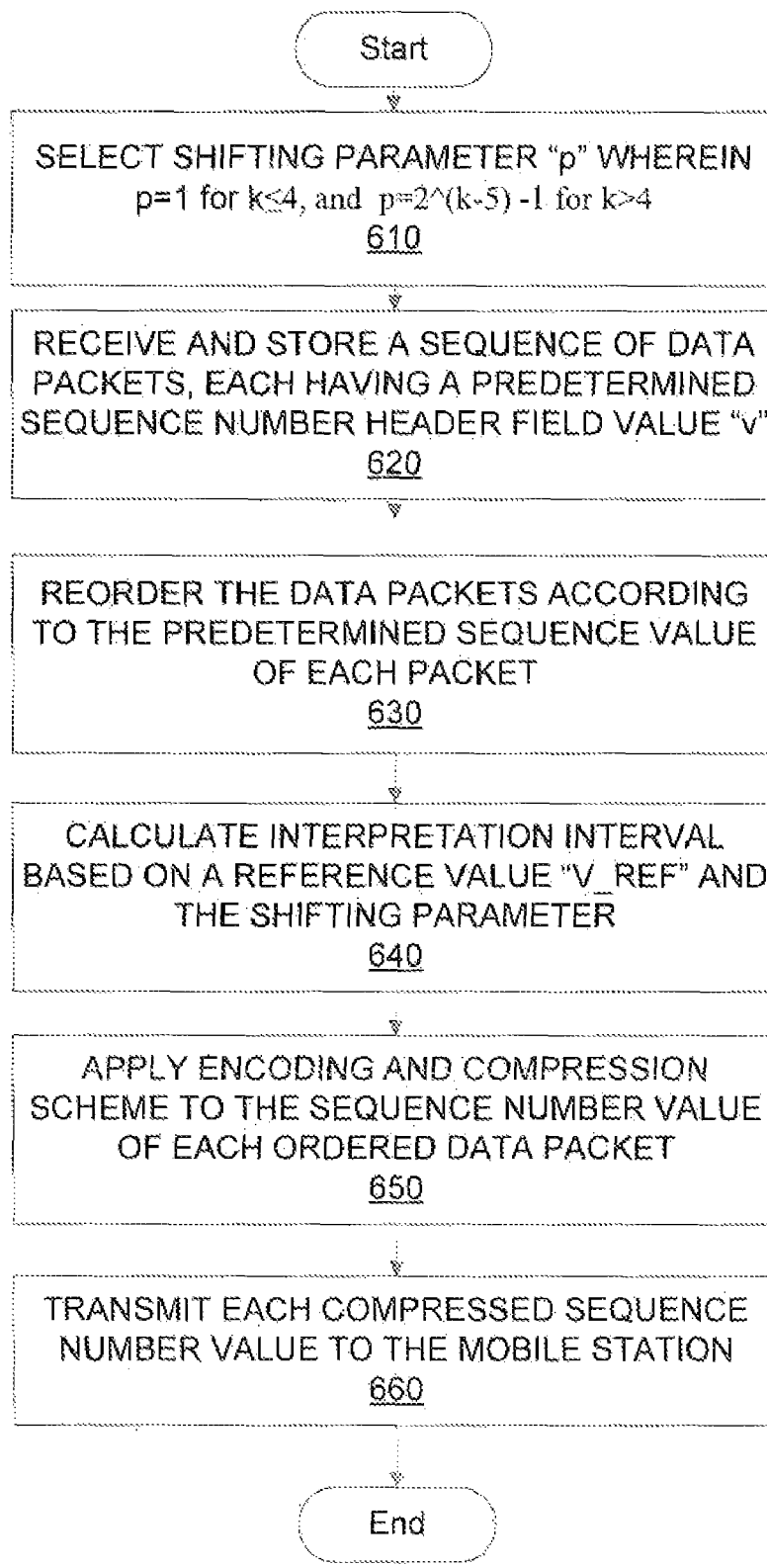
FIG. 6 illustrates a method for encoding out of order data packets within the data transmission network, according to an alternate embodiment of the invention.

FIG. 6 illustrates a method for encoding out of order data packets within the network 30, according to an alternate embodiment of the invention. As illustrated in FIG. 6, at processing block 610, a shifting parameter "p" is selected as p=1 for k≤4, and p=$2^{k-5}$−1 for k>4.

At processing block 620, a sequence of data packets 400 is received and stored, each data packet 400 having a predetermined sequence number header field value "v". At processing block 630, the data packets 400 are reordered according to the sequence number header field value "v." At processing block 640, an interpretation interval is calculated according to a function f(v_ref, k)=[v_ref−p, v_ref+($2^k$−1)−p], for a previously transmitted reference value "v_ref." At processing block 650, an encoding and compression scheme is applied to the value "v" of each ordered data packet 400. Finally, at processing block 660, the compressed value "v" of each data packet 400 is transmitted to the destination unit 20 in a minimum size packet type.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing or transmitting information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a receiver module for receiving a data packet from a network;
a compression module, coupled to said receiver module, for encoding a predetermined header field value within said data packet,
wherein encoding includes determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value,
wherein said shifting parameter is equal to K, if k is equal to or less than a first value, and
wherein said shifting parameter is equal to $2^{k-5}$+K, if k is greater than the first value; and
a transmitter module, coupled to said compression module, for transmitting said encoded header field value to a destination unit for restoring said data packet.

2. The apparatus according to claim 1, wherein said shifting interval is calculated as a function of a transmitted reference value and said shifting parameter dependent on said maximum out of order range value of data packets to be encoded with a minimum header size.

3. The apparatus according to claim 2, wherein said shifting parameter is equal to K, if k is equal to or less than four.

4. The apparatus according to claim 2, wherein said shifting parameter is equal to $2^{k-5}$÷K, if k is greater than four.

5. The apparatus according to claim 1, wherein said network is a wireless network.

6. The apparatus according to claim 1, wherein said network is a wireline network.

7. The apparatus according to claim 1, wherein said data packet is transmitted within said network via a Real-Time Transfer Protocol (RTP) and wherein said predetermined header field value further comprises an RTP sequence number associated with said data packet.

8. A method comprising:
receiving at a receiver module, a data packet from a network;
encoding at a compression module coupled to said receiver module, a predetermined header field value within said data packet,
wherein encoding includes determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value,
wherein said shifting parameter is equal to K, if k is equal to or less than a first value, and
wherein said shifting parameter is equal to $2^{k-5}$+K, if k is greater than the first value; and
transmitting from a transmitter module coupled to said compression module, said encoded header field value to a destination unit for restoring said data packet.

9. The method according to claim 8, further comprising calculating said shifting interval as a function of a transmitted reference value and said shifting parameter dependent on said maximum out of order range value of data packets to be encoded with a minimum header size.

10. The method according to claim 9, wherein said shifting parameter is equal to k is equal to or less than four.

11. The method according to claim 9, wherein said shifting parameter is equal to $2^{k-5}$÷K, if k is greater than four.

12. The method according to claim 8, wherein said data packet is transmitted within said network via a Real-Time Transfer Protocol (RTP) and wherein said predetermined header field value further comprises an RTP sequence number associated with said data pack et.

13. An apparatus comprising:
means for receiving a data packet from a network;
means for encoding a predetermined header field value within said data packet,
wherein means for encoding include means for determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value,
wherein said shifting parameter is equal to K, if k is equal to or less than a first value, and
wherein said shifting parameter is equal to $2^{k-5}$+K, if k is greater than the first value; and
means for transmitting said encoded header field value to a destination unit for restoring said data packet.

14. The apparatus according to claim 13, further comprising means for calculating said shifting interval as a function of a transmitted reference value and said shifting parameter dependent on said maximum out of order range value of data packets to be encoded with a minimum header size.

15. The apparatus according to claim 14, wherein said shifting parameter is equal to K, if k is equal to or less than four.

16. The apparatus according to claim 14, wherein said shifting parameter is equal to $2^{k-5}+K$, if k is greater than four.

17. The apparatus according to claim 13, wherein said data packet is transmitted within said network via a Real-Time Transfer Protocol (RTP) and wherein said predetermined header field value further comprises an RTP sequence number associated with said data packet.

18. A non-transitory computer readable medium containing executable instructions, which, when executed in a processing system, cause said processing system to perform a method comprising:
receiving a data packet from a network;
encoding a predetermined header field value within said data packet,
wherein encoding includes determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value,
wherein said shifting parameter is equal to K, if k is equal to or less than a first value, and
wherein said shifting parameter is equal to $2^{k-5}+K$, if k is greater than the first value; and
transmitting said encoded header field value to a destination unit for restoring said data packet.

19. The non-transitory computer readable medium according to claim 18, wherein said method further comprises calculating said shifting interval as a function of a transmitted reference value and said shifting parameter dependent on said maximum out of order range value of data packets to be encoded with a minimum header size.

20. The non-transitory computer readable medium according to claim 19, wherein said shifting parameter is equal to K, if k is equal to or less than four.

21. The non-transitory computer readable medium according to claim 19, wherein said shifting parameter is equal to $2^{k-5}+K$, if k is greater than four.

22. The non-transitory computer readable medium according to claim 18, wherein said data packet is transmitted within said network via a Real-Time Transfer Protocol (RTP) and wherein said predetermined header field value further comprises an RTP sequence number associated with said data packet.

23. An apparatus comprising:
a receiver module for receiving an encoded header field value from a source unit within a network, said encoded header field value being associated to a header field value of a data packet received at said source unit, said header field value being encoded at said source unit based on a shifting parameter dependent on a maximum out of order range value (K) of data packets to be encoded with a minimum header size and a number of least significant bits (k) used to transmit said encoded header field value to the source unit,
wherein said shifting parameter is equal to K, if k is equal to or less than a first value, and
wherein said shifting parameter is equal to $2^{k-5}+K$, if k is greater than the first value; and
a decompression module, coupled to said receiver module, for decoding said encoded header field value to obtain said original header field value and for restoring said data packet using said header field value.

24. The apparatus according to claim 23, wherein said decompression module decodes said encoded header field value based on a shifting interval of header field values associated with previously transmitted data packets, including a transmitted reference value.

25. The apparatus according to claim 24, wherein said shifting interval is calculated as a function of said transmitted reference value and said shifting parameter dependent on said maximum out of order range value of data packets to be encoded with a minimum header size.

26. The apparatus according to claim 25, wherein said shifting parameter is equal to said maximum out of order range value of data packets to be encoded with a minimum header size, if a number of least significant bits used to transmit said encoded header field value is equal to or less than four.

27. The apparatus according to claim 25, wherein said shifting parameter is equal to $2^{k-5}+K$, where K is said maximum out of order range value of data packets to be encoded with a minimum header size, and a number of least significant bits k used to transmit said encoded header field value is greater than four.

28. The apparatus according to claim 23, wherein said network is a wireless network.

29. The apparatus according to claim 23, wherein said network is a wireline network.

30. A method comprising:
receiving at a receiver module, an encoded header field value from a source unit within a network, said encoded header field value being associated to a header field value of a data packet received at said source unit, said header field value being encoded at said source unit based on a shifting parameter dependent on a maximum out of order range value (K) of data packets to be encoded with a minimum header size and a number of least significant bits (k) used to transmit said encoded header field value to the source unit,
wherein said shifting parameter is equal to K, if k is equal to or less than a first value, and
wherein said shifting parameter is equal to $2^{k-5}+K$, if k is greater than the first value;
decoding at a decompression module coupled to said receiver module, said encoded header field value to obtain said original header field value; and
restoring said data packet using said header field value.

31. The method according to claim 30, wherein said decoding further comprises decoding said encoded header field value based on a shifting interval of header field values associated with previously transmitted data packets, including a transmitted reference value.

32. The method according to claim 31, further comprising calculating said shifting interval as a function of said transmitted reference value and said shifting parameter dependent on said maximum out of order range value of data packets to be encoded with a minimum header size.

33. The method according to claim 32, wherein said shifting parameter is equal to said maximum out of order range value of data packets to be encoded with a minimum header size, if a number of least significant bits used to transmit said encoded header field value is equal to or less than four.

34. The method according to claim 32, wherein said shifting parameter is equal to $2^{k-5}+K$, where K is said maximum out of order range value of data packets to be encoded with a minimum header size, and a number of least significant bits k used to transmit said encoded header field value is greater than four.

35. An apparatus comprising:
means for receiving an encoded header field value from a source unit within a network, said encoded header field value being associated to a header field value of a data packet received at said source unit, said header field value being encoded at said source unit based on a shifting parameter dependent on a maximum out of order range value (K) of data packets to be encoded with a minimum header size and a number of least significant bits (k) used to transmit said encoded header field value to the source unit,
wherein said shifting parameter is equal to K, if k is equal to or less than a first value, and
wherein said shifting parameter is equal to $2^{k-5}$+K, if k is greater than the first value;
means for decoding said encoded header field value to obtain said original header field value; and
means for restoring said data packet using said header field value.

36. The apparatus according to claim 35, further comprises means for decoding said encoded header field value based on a shifting interval of header field values associated with previously transmitted data packets, including a transmitted reference value.

37. The apparatus according to claim 36, further comprising means for calculating said shifting interval as a function of said transmitted reference value and said shifting parameter dependent on said maximum out of order range value of data packets to be encoded with a minimum header size.

38. The apparatus according to claim 37, wherein said shifting parameter is equal to said maximum out of order range value of data packets to be encoded with a minimum header size, if a number of least significant bits used to transmit said encoded header field value is equal to or less than four.

39. The apparatus according to claim 37, wherein said shifting parameter is equal to $2^{k-5}$+K, where K is said maximum out of order range value of data packets to be encoded with a minimum, header size, and a number of least significant bits k used to transmit said encoded header field value is greater than four.

40. A non-transitory computer readable medium containing executable instructions, which, when executed in a processing system, cause said processing system to perform a method comprising:
receiving an encoded header field value from a source unit within a network, said encoded header field value being associated to a header field value of a data packet received at said source unit, said header field value being encoded at said source unit based on a shifting parameter dependent on a maximum out of order range value (K) of data packets to be encoded with a minimum header size and a number of least significant bits (k) used to transmit said encoded header field value to the source unit,
wherein said shifting parameter is equal to K, if k is equal to or less than a first value, and
wherein said shifting parameter is equal to $2^{k-5}$+K, if k is greater than the first value;
decoding said encoded header field value to obtain said original header field value; and
restoring said data packet using said header field value.

41. The non-transitory computer readable medium according to claim 40, wherein said decoding further comprises decoding said encoded header field value based on a shifting interval of header field values associated with previously transmitted data packets, including a transmitted reference value.

42. The non-transitory computer readable medium according to claim 41, wherein said method further comprises calculating said shifting interval as a function of said transmitted reference value and said shifting parameter dependent on said maximum out of order range value of data packets to be encoded with a minimum header size.

43. The non-transitory computer readable medium according to claim 42, wherein said shifting parameter is equal to said maximum out of order range value of data packets to be encoded with a minimum header size, if a number of least significant bits used to transmit said encoded header field value is equal to or less than four.

44. The non-transitory computer readable medium according to claim 42, wherein said shifting parameter is equal to $2^{k-5}$+K, where K is said maximum out of order range value of data packets to be encoded with a minimum header size, and a number of least significant bits k used to transmit said encoded header field value is greater than four.

45. An apparatus comprising:
a buffer module for receiving at least one data packet from a network and for ordering said at least one data packet based on a predetermined header field value associated with each data packet;
a compression module, coupled to said buffer device, for receiving each ordered data packet and for encoding said respective predetermined header field value to obtain an encoded header field value, wherein encoding includes determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value,
wherein said shifting parameter is equal to K, if k is equal to or less than a first value, and
wherein said shifting parameter is equal to $2^{k-5}$+K, if k is greater than the first value; and
a transmitter module, coupled to said compression module, for transmitting said encoded header field value to a destination unit for restoring said each data packet.

46. The apparatus according to claim 45, wherein said buffer module has a predetermined capacity equal to said maximum Out of order range value of received data packets to be encoded with a minimum header size.

47. The apparatus according to claim 46, wherein said buffer module further stores said each ordered data packet up to said predetermined capacity prior to transmission to said compression module.

48. The apparatus according to claim 45, wherein said network is a wireless network.

49. The apparatus according to claim 45, wherein said network is a wireline network.

50. The apparatus according to claim 45, wherein said at least one data packet is transmitted within said network via a Real-Time Transfer Protocol (RTP) and wherein said predetermined header field value further comprises an RTP sequence number associated with said each data packet.

51. A method comprising:
receiving at a receiver module, at least one data packet from a network;
ordering said at least one data packet in a buffer module based on a predetermined header field value associated with each data packet;

encoding at a compression module coupled to said buffer module, said respective predetermined header field value of said each data packet to obtain an encoded header field value, wherein encoding includes determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value, wherein said shifting parameter is equal to K, if k is equal to or less than a first value, and wherein said shifting parameter is equal to $2^{k-5}+K$, if k is greater than the first value; and transmitting from a transmitting module coupled to said compression module, said encoded header field value to a destination unit for restoring said each data packet.

52. The method according to claim 51, wherein said buffer module has a predetermined capacity equal to said maximum out of order range value of received data packets to be encoded with a minimum header size.

53. The method according to claim 52, further comprising storing said each ordered data packet in said buffer module up to said predetermined capacity prior to encoding of said respective predetermined header field value.

54. An apparatus comprising:
means for receiving at least one data packet from a network;
means for ordering said at least one data packet based on a predetermined header field value associated with each data packet;
means for encoding said respective predetermined header field value of said each data packet to obtain an encoded header field value, wherein encoding includes determining a shifting interval of header field values associated with previously received data packets, the shifting interval being calculated as a function of a shifting parameter dependent on a maximum out of order range value (K) of data packets to be encoded with a minimum header size and a number of least significant bits (k) used to transmit said encoded header field value,
wherein said shifting parameter is equal to K, if k is equal to or less than a first value, and
wherein said shifting parameter is equal to $2^{k-5}+K$, if k is greater than the first value; and
means for transmitting said encoded header field value to a destination unit for restoring said each data packet.

55. The apparatus according to claim 54, further comprising means for storing said each ordered data packet, up to a predetermined capacity equal to said maximum out of order range value of received data packets to be encoded with a minimum header size, prior to encoding of said respective predetermined header field value.

56. A non-transitory computer readable medium containing executable instructions, which, when executed in a processing system, cause said processing system to perform a method comprising:
receiving at least one data packet from a network;
ordering said at least one data packet in a buffer module based on a predetermined header field value associated with each data packet;
encoding said respective predetermined header field value of said each data packet to obtain an encoded header field value wherein encoding includes determining a shifting interval of header field values associated with previously received data packets, the shifting interval being calculated as a function of a shifting parameter dependent on a maximum out of order range value (K) of data packets to be encoded with a minimum header size, and a number of least significant bits (k) used to transmit said encoded header field value,
wherein said shifting parameter is equal to K, if k is equal to or less than a first value, and
wherein said shifting parameter is equal to $2^{k-5}+K$, if k is greater than the first value; and
transmitting said encoded header field value to a destination unit for restoring said each data packet.

57. The non-transitory computer readable medium according to claim 56, wherein said buffer module has a predetermined capacity equal to said maximum out of order range value of received data packets to be encoded with a minimum header size.

58. The non-transitory computer readable medium according to claim 57, wherein said method further comprises storing said each ordered data packet in said buffer module up to said predetermined capacity prior to encoding of said respective predetermined header field value.

59. An apparatus comprising:
means for selecting an out-of-order parameter (K) as a maximum out of order range value of data packets to be encoded with a minimum header size and a shifting parameter dependent on said out-of-order parameter;
means for calculating a shifting interval of header field values associated with previously received data packets, including a transmitted reference value, as a function of said transmitted reference value and said shifting parameter;
means for encoding a predetermined header field value within a data packet received from a network based on said shifting interval, said out-of-order parameter and said shifting parameter to obtain an encoded header field value; and
means for transmitting said encoded header field value to a destination unit for restoring said data packet,
wherein said shifting parameter is equal to K, if a number of least significant bits (k) used to transmit said encoded header field value is equal to or less than a first value, and
wherein said shifting parameter is equal to $2^{k-5}+K$, if k is greater than the first value.

60. The apparatus according to claim 59, wherein said shifting parameter is equal to said out-of-order parameter, if the number of least significant bits used to transmit said encoded header field value is equal to or less than four.

61. The apparatus according to claim 59, wherein said shifting parameter is equal to $2^{k-5}+K$, if the number of least significant bits k used to transmit said encoded header field value is greater than four.

* * * * *